AUTOMATIC READING APPARATUS

Filed March 1, 1954

ALONZO W. NOON,
CHARLES B. CLARK
INVENTORS

BY Lyon & Lyon

ATTORNEYS

United States Patent Office 2,801,796

Patented Aug. 6, 1957

2,801,796

AUTOMATIC READING APPARATUS

Alonzo W. Noon, Los Altos, and Charles B. Clark, Menlo Park, Calif.

Application March 1, 1954, Serial No. 413,176

6 Claims. (Cl. 235—61.11)

This invention relates to automatic reading devices and, more particularly, to a system for automatically reading code markings consisting of discrete areas of magnetizable material.

One of the problems confronting the employment of information handling machines in modern business is that of presenting the information appearing on letters, receipts, checks, and the like into a form which can be readily entered into such information handling machine. Many systems are employed for converting the information into the form which the machine can use. There are systems whereby the data or information is typed using perforated tape to receive markings. The perforated tape is then read by an automatic tape reading device, and the output is entered into the machine in the form of a binary code. Another system is to type the information to be entered into the machine on magnetic tape in the form of the presence or absence of magnetic pulses. This magnetic tape is then read and the output entered into the machine. Still another system which finds great favor today is to enter the desired information on perforated cards, and apparatus is provided to read automatically from these cards into the information handling machine.

In these various schemes the data is taken from the paper on which it is written, transcribed to another recording medium, and then entered into the machine. However, where it is required that data on paper of a type such as a check, order, or a receipt is to be automatically entered into the machine and the paper then handled or distributed in accordance with this data, the previously mentioned systems are inadequate for the purpose. Some mechanism must be provided for identifying the data appearing on the check or receipt with that check or receipt while the information is being entered automatically into the information handling machine, so that the data may be used for a desired purpose of computation and the check, order, or receipt then identified, and either additional data is added as a result of the machine operation or the paper is sorted or distributed in accordance with such data. Of course, one scheme for doing this is obviously to use some method of transferring the written information into a coded form which can be transferred automatically into the machine and yet will stay with the paper so that it can be identified when necessary. This is accomplished by applying markings on the check or receipt in code which are susceptible to automatic reading. Such markings, for example, may be perforations or ink markings arranged in different patterns which may be read automatically by using light and phototubes. Another method which can be employed to identify these sheets of paper is to lay down a pattern of magnetic markings and then move these sheets past a reading position so that the code which is represented by the magnetic markings is transferred into electrical signals.

The present invention relates to improved apparatus for automatically sensing information in code which is magnetically recorded on a sheet of flexible material, such as paper and the like. A feature of this invention is that it permits the rapid handling of checks, orders, receipts, and the like while automatically reading data recorded thereon as magnetizable areas. Still another feature of this invention is that it magnetizes discrete areas of magnetic material laid down in a coding pattern so that they can be read subsequently by magnetic transducer heads.

These and other features of the invention are obtained by providing apparatus including a receiving section and a reading section. Checks, bills, orders, or receipts upon which coded data has been recorded as the presence or absence of magnetizable material in given discrete areas for the purpose of identifying the flexible sheets and, also, for the purpose of providing data for an information handling machine are entered into the receiving section. There they are automatically aligned, and the magnetizable areas on these flexible sheets are magnetized. They are then conveyed by a conveyor belt into the receiving section. The discrete areas which were magnetized pass by magnetic transducer heads. These convert the data into electrical signals which can then be utilized by the subsequent apparatus. The information remains recorded in coded form on the flexible sheet and thus can permit subsequent identification and disposition in accordance with the dictates of the machine to which the information has thus been automatically supplied.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

Figure 1 is a plan view of the automatic code-reading apparatus;

Figure 1*a* is a section of a sheet of flexible material, showing how the identifying code is recorded thereon;

Figures 1, 1A, 2, 3, 4:
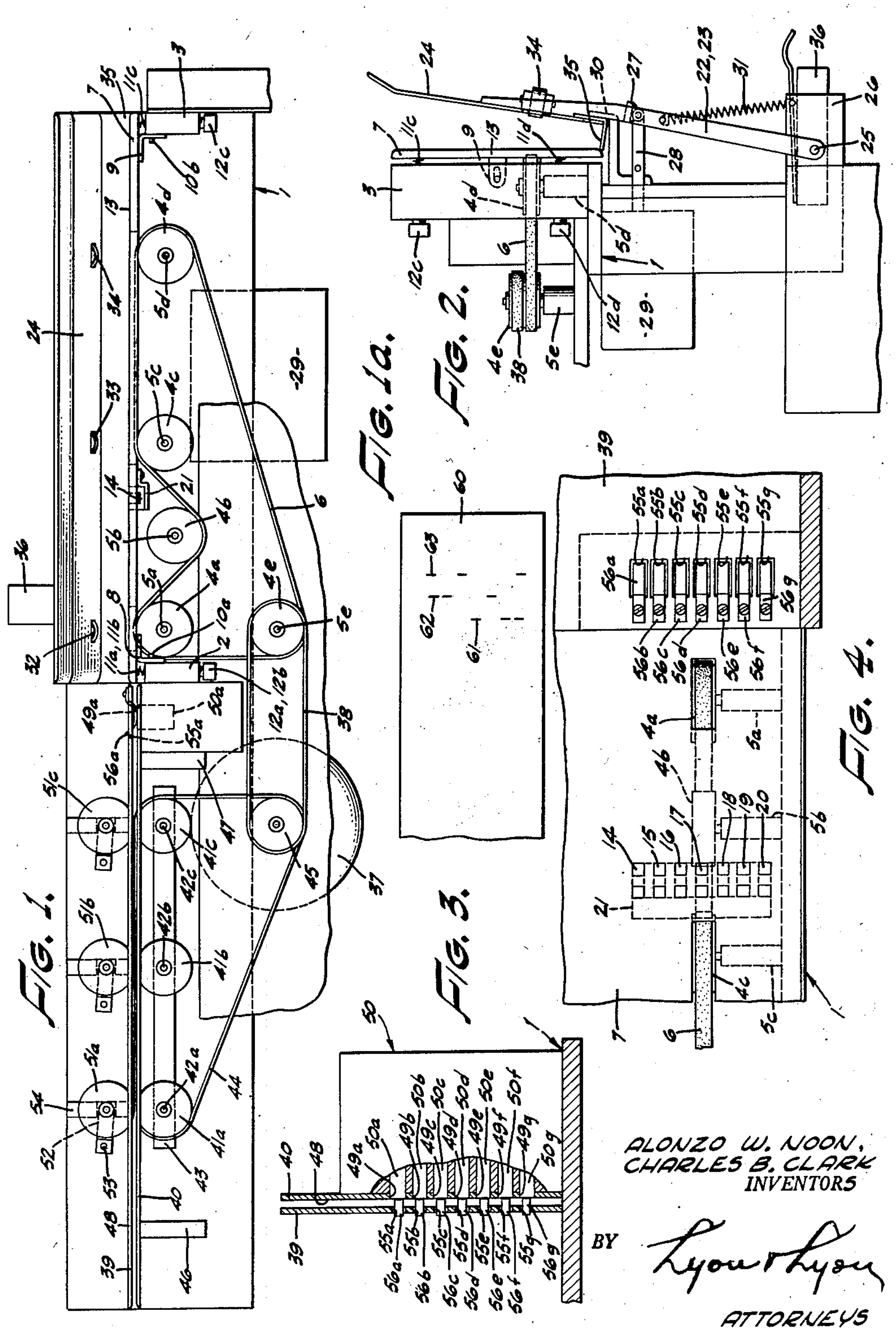
Figure 2 is a side view of the embodiment of the invention shown in Figure 1 and is presented to show the receiving section of the apparatus.
Figure 3 is a detail of the arrangement of the magnetic transducer heads shown in Figure 1.
Figure 4 is a section of Figure 3 to show the arrangement of the transducing heads and the magnets which magnetize discrete areas of magnetic material on the flexible sheet being transported through the apparatus.

As previously indicated, the invention herein, consisting of an automatic reading device, is employed to read data recorded on what may be termed flexible sheets, which generically represents checks, bills, receipts, and the like. The data recording is done by providing, in a predesignated section of the flexible sheets a plurality of code markings. These code markings may be in the binary code, for example. They represent the information on the flexible sheet which it is desired to enter into an information handling machine. These code markings consist of discrete areas of magnetizable material, the binary code being represented by the presence or absence of a discrete area at a given location. By way of example, Figure 1*a* represents a section of a flexible sheet 60. Assume, for the purpose of illustration, that data is represented in a binary code consisting of seven-digit words— that is, each word includes seven binary digits. It will be appreciated that a binary digit can be represented as the presence or absence of a signal. Regarding Figure 1*a*, three words 61, 62, 63 are represented on the flexible sheet; reading from top to bottom, the first word may be represented by 0001011, the second word by 1100100, and the third word by 1010001. The dashes in the code area are representative of discrete areas wherein magnetizable material has been deposited. Each number has all the digits aligned in a vertical direction, and, accordingly, the "1" digits can be said to be represented by the presence of discrete areas of magnetizable material and the "0" digits can be said to be represented by the absence of discrete areas of magnetizable material. These code word patterns can be laid down by code-printing apparatus, such as a typewriter, which has code instead of letters on its type bars and which uses ink containing a suspension of magnetizable material. Inks of this type are known in the field of ferrography, for example. Accordingly, it will be appreciated that should a bill, check, or receipt contain information which it is desired to enter into a machine, this information can be printed in the form shown in Figure 1*a* in a predesignated area in the form of the presence or absence of discrete areas of magnetizable material.

The next problem is how to read data presented in this form. This is solved by the embodiment of the invention shown in Figure 1. Referring now to the figures in the drawing, a base plate 1 is designed to provide a base on which to mount backing plate supports 2 and 3 and flanged drive belt wheels **4*a*, 4*b*, 4*c*, 4*d*, and 4*e*. The wheels are spaced above the base plate 1 on shouldered stub shafts 5*a*, 5*b*, 5*c*, 5*d*, and 5*e* and are free to revolve on said shafts. A drive belt 6 is arranged to travel in a counterclockwise direction around the wheels 4*a*, 4*b*, 4*c*, 4*d*, and 4*e*. Drive belt 6 is driven by a motor 37 through a connecting belt 38. A backing plate 7 is secured to supports 2 and 3 by slotted angle brackets 8 and 9 and the pins 10*a* and 10*b*. These pins are press fitted in the supports 2 and 3, respectively. These brackets permit the backing plate 7 to move inwardly toward the supports 2 and 3 and, also, to rotate slightly around the pins 10*a* and 10*b*. By means of compression springs 11*a*, 11*b*, 11*c*, and 11*d*, the backing plate is held normally away from the said supports 2 and 3 and in a vertical plane. The force exerted by each of these compression springs can be adjusted by the respective adjusting screws 12*a*, 12*b*, 12*c*, and 12*d*. It should be noted that when the backing plate 7 is in its normal position the outer surface of the drive belt 6 sets back from the inside surface 13 of the backing plate. Permanent magnets 14, 15, 16, 17, 18, 19, and 20, as may be seen in Figure 4, are mounted and securely held in position, one above the other, by a bracket 21**.

An aperture is cut in the backing plate 7 so that the magnets extend therethrough and their pole faces are flush with the inside surface 13 of the backing plate. Facing the backing plate and supported by the upper ends of the arms 22, 23 is the pressure plate 24. The said arms are pivotally mounted at their lower ends by rod 25, said rod being supported by bearings in the base 26. Securely fastened at each end to the arms 22, 23 is the tie bar 27. At the midpoint of said tie bar is pinned one end of the link 28. The other end of said link is pinned to the armature of a solenoid 29. Also located approximately at the midpoint is the stop 30, which serves to limit the size of the opening between the backing plate 7 and the pressure plate 24 when the solenoid 29 is not energized. A tension spring 31 is arranged to pull the pressure plate 24 against the stop 30. Three small idler rollers 32, 33, and 34, free to rotate, are mounted on pressure plate 24 so that their peripheries can project slightly through apertures in said pressure plate into the space between pressure plate 24 and backing plate 7. As may be seen from Figures 1 and 2, the mounting of these rollers is such that they will contact the drive belt 6 when solenoid 29 is energized, to thereby pull the pressure plate 24 against the backing plate 7. The pressure plate 24 has attached thereto a bottom plate 35. This is attached to the lower edge of the pressure plate 24, forming therewith a substantially U-shaped cavity in which the flexible sheet consisting of a check, receipt, and the like, which it is desired to read, can be dropped. A micro-switch 36 is mounted on the base 26. It is connected in circuit with a power supply and the solenoid 29, so that, when the switch is pressed, the solenoid is energized.

The reading section of the device will now be described. An extension of base plate 1 projects from the receiving section to support a front guide plate 39 and a back guide plate 40. Three drive belt wheels **41*a*, 41*b*, and 41*c*, which are similar to those (4*a*, 4*b*, 4*c*, 4*d*, and 4*e*) in the receiving section, are mounted by means of stub shafts 42*a*, 42*b*, and 42*c*, all of which are supported above the base plate 1 by the support 43. The drive belt 44 is arranged to travel in a counterclockwise direction around said drive belt wheels and the motor pulley 45. A transverse slot is cut in the back guide plate 40 and the drive belt 44 extends into the passage between the front and back guide plates through this slot. Narrow slots 49*a*, 49*b*, 49*c*, 49*d*, 49*e*, 49*f*, and 49*g* are milled one above the other near the reading edge of the back plate 40 (see Figure 3). Multiple magnetic transducer reading heads 50*a*, 50*b*, 50*c*, 50*d*, 50*e*, 50*f*, and 50*g* are secured to a vertical member 47. The operating surfaces of these reading heads project through the slots in the back guide plate, these surfaces being approximately flush with the inner surface 48** of the back guide plate.

Three idler wheels **51*a*, 51*b*, and 51*c* are mounted so that they bear through apertures in the front guide plate 39 against the drive belt 44. Since all three are similarly mounted, only one will be described. The wheel 51*a* rotates on a stub shaft press fitted into one end of a short arm 52. The other end of this arm can pivot about the pin 53, which is press fitted into the block 54. This block also serves to support the front guide plate 39. The free end of the arm 52 which carries the wheel 51*a* is pushed inwardly by a compression spring (not shown) in block 54. In this way, the idler wheels are at all times caused to bear against the drive belt. Narrow slots 55*a*, 55*b*, 55*c*, 55*d*, 55*e*, 55*f*, and 55*g* are milled in the front guide plate 39 similar in size and opposite to those already described in the back guide plate 40. Secured to the front guide plate at the leading edge of the said slots are leaf springs 56*a*, 56*b*, 56*c*, 56*d*, 56*e*, 56*f*, and 56*g***, which are arranged to project through the slots into the passageway as shown. These leaf springs serve to press the coded portion of a check or receipt against the magnetic reading heads as the check passes, just as the idler wheels serve to press the check or receipt against the drive belt, and thus the check is carried through the apparatus.

The operation of the system is as follows: With its long dimension held more or less horizontal, a check or receipt is dropped into the receiving section. Of course, care is taken to orient the check or receipt with one side uppermost at all times and the magnetizable material areas toward the magnets and reading heads. After the check or receipt has dropped to the bottom plate 35, the operator presses switch 36. This excites the solenoid 29, which thereupon pulls the pressure plate 24 closed against backing plate 7. Thus the receipt is pulled flat against backing plate 7. The action of the springs **11*a*, 11*b*, 11*c*, and 11*d*, by means of which the backing plate is supported, permits it to be moved backwards so that the face of the drive belt 6 presses firmly against the face of the receipt. The idler rollers 32, 33, and 34 bear against the other face of the flexible sheet so that it is squeezed between the idler rollers and the drive belt. Since the drive belt 6 is already in motion, the receipt moves toward the reading section. As it does so, the coding marks 61, 62, 63 printed upon the back face of the receipt pass over the magnets 14, 15, 16, 17, 18, 19, and 20** and are thereby magnetized. The receipt is then conveyed into the reading section, where drive belt 44 and idlers **51*a*, 51*b*, and 51*c* pick up the leading edge and continue to carry it through the passage. In passing through the passage in the reading section, the leaf springs 56*a*, 56*b*, 56*c*, 56*d*, 56*e*, 56*f*, and 56*g* press the coded area of the flexible sheet against the magnetic transducer heads, thus inducing therein voltages representative of the binary code words recorded. The flexible sheet is then conveyed out of the passageway by the conveyor belt 44 and rollers. Its subsequent handling is determined by the apparatus to which the information which has been read is supplied. The apparatus functions rapidly and effectively. As soon as the solenoid releases the pressure plate 24, a new check or receipt can be dropped into the receiving section and the switch 36** again actuated for a subsequent reading.

The coded data is obtained as a parallel "word" consisting of seven digits (shown by way of example).

Accordingly, there has been described and shown above apparatus for automatically reading information recorded on a flexible sheet as the presence or absence of discreate areas of magnetizable material.

We claim:

1. Apparatus for automatically reading digitally coded data recorded as the presence or absence of discrete areas of magnetizable material on a flexible sheet such as paper and the like, comprising means to receive said sheets including a backing plate, a pressure plate, a bottom plate attached to and extending along and at right angles to one side of said pressure plate, a received sheet resting against said pressure plate with one edge on said bottom plate, means to urge said pressure plate toward face-to-face relationship with said backing plate, a first sheet conveying means engaged when said pressure plate has been pivoted to press said sheet against said backing plate, and magnetizing means past which said first sheet conveying means carries said sheet to magnetize said discrete areas; magnetic transducer means, a second sheet conveying means to which said first sheet conveying means carries said sheet, said second sheet conveying means being adapted to convey said sheet past said magnetic transducer means to induce therein voltages representative of the recorded digital data.

2. Apparatus as recited in claim 1 wherein said first sheet conveying means includes a conveyor belt extending longitudinally alongside of said backing plate, longitudinal slots in said backing plate through which said conveyor belt engages a sheet when said pressure plate is pivotally urged toward said backing plate, and a plurality of idler wheels mounted on at spaced positions along said pressure plate, said idler wheels being rotatably mounted on said pressure plate, slots in said pressure plate through which the peripheries of said idler wheels extend toward said backing plate, and said idler wheels being positioned to have their peripheries extend substantially opposite said conveyor belt and being adapted to rotate in the direction of motion of said conveyor belt.

3. Apparatus as recited in claim 1 wherein said magnetizing means comprises a plurality of permanent magnets, a transverse slot in said backing plate, means to mount said magnets on said backing plate to extend through said slots with one of their pole faces flush with the face of said backing plate which is toward said pressure plate to be in magnetizing relationship with the discrete magnetizable areas of a sheet being conveyed by said first conveying means.

4. Apparatus as recited in claim 2 wherein said means to urge said pressure plate towards said backing plate includes a solenoid having an armature and a coil, means to operatively connect said armature to said pressure plate to pivotally urge it toward said backing plate when said coil is excited, and switch means coupled to said armature to control its excitation.

5. Apparatus for automatically reading digitally coded data recorded as the presence or absence of discrete areas of magnetizable material on a flexible sheet, such as paper and the like, comprising a sheet receiving section, and a sheet reading section, said sheet receiving section including a pressure plate, a bottom plate attached to and extending along and at right angles to one side of said pressure plate, a received sheet resting against said pressure plate with one edge on said bottom plate, a backing plate, means to yieldably support said backing plate, means to pivotally support said pressure plate with said bottom plate in proximity to one edge of said backing plate, a conveyor belt extending longitudinally alongside of said backing plate, longitudinal slots in said backing plate extending with said conveyor belt, a plurality of idler wheels mounted on and at spaced positions along said pressure plate, said idler wheels being rotatably mounted on said pressure plate, slots in said pressure plate through which the peripheries of said idler wheels extend toward said backing plate, said idler wheels being positioned to have their peripheries extend substantially opposite said conveyor belt and being adapted to rotate in the direction of motion of said conveyor belt, a plurality of permanent magnets, a transverse slot in said backing plate near the end toward which said conveyor belt moves, means to mount said magnets on said backing plate to extend through said slot to have one of their pole faces flush with the face of said pressure plate, means to pivotally urge said pressure plate to face-to-face relationship with said backing plate to press back said yieldably supported backing plate to permit said conveyor belt to extend through said slots to convey a received sheet past said magnets to magnetize said discrete magnetizable areas to said reading section to be read.

6. Apparatus for automatically reading digitally coded data recorded as the presence or absence of discrete areas of magnetizable material on a flexible sheet, such as paper and the like, comprising a sheet receiving section, and a sheet reading section, said sheet receiving section including a pressure plate, a bottom plate attached to and extending along and at right angles to one side of said pressure plate, a received sheet resting against said pressure plate with one edge on said bottom plate, a backing plate, means to yieldably support said backing plate, means to pivotally support said pressure plate with said bottom plate in proximity to one edge of said backing plate, a conveyor belt extending longitudinally alongside of said backing plate, longitudinal slots in said backing plate extending with said conveyor belt, a plurality of idler wheels mounted on and at spaced positions along said pressure plate, said idler wheels being rotatably mounted on said pressure plate, slots in said pressure plate through which the peripheries of said idler wheels extend toward said backing plate, said idler wheels being positioned to have their peripheries extend substantially opposite said conveyor belt and being adapted to rotate in the direction of motion of said conveyor belt, a plurality of permanent magnets, a transverse slot in said backing plate near the end toward which said conveyor belt moves, means to mount said magnets on said backing plate to extend through said slot to have one of their pole faces flush with the face of said pressure plate, and means to pivotally urge said pressure plate to face-to-face relationship with said backing plate to press back said yieldably supported backing plate to permit said conveyor belt to extend through said slots to convey a received sheet past said magnets to magnetize said discrete magnetizable areas to said reading section; said reading section including a passage defined by a front guide plate, a back guide plate positioned opposite and spaced apart from said front guide plate, a transverse slot in said back guide plate near the end closest to said receiving section, a plurality of transducer heads, means to mount said plurality of transducer heads at said transverse slot with their operating surfaces substantially flush with said back plate surface and facing said passage, a plurality of leaf springs, means to mount said leaf springs on said front guide plate into said passage opposite said transducer heads to press a received sheet against said transducer heads, a longitudinally extending slot in said back guide plate, a second conveyor belt extending into said passage through said slot, a plurality of slots in said front guide plate, a plurality of idler wheels, means to mount each of said plurality of idler wheels to have its periphery extend into said passage through a different one of said plurality of slots to be yieldably urged against said second conveyor belt, said second conveyor belt and idler wheels being positioned to receive a sheet from said sheet receiving section and convey it through said passage, and means to move said conveyor belts at substantially the same speed.

References Cited in the file of this patent

UNITED STATES PATENTS

| | | |
|---|---|---|
| 2,254,931 | Bryce | Sept. 2, 1941 |
| 2,547,838 | Russell | Apr. 3, 1951 |
| 2,685,409 | English et al. | Aug. 3, 1954 |

FOREIGN PATENTS

| | | |
|---|---|---|
| 686,289 | Great Britain | Jan. 21, 1953 |